(12) United States Patent
Stephany et al.

(10) Patent No.: US 6,643,237 B2
(45) Date of Patent: Nov. 4, 2003

(54) METHOD AND APPARATUS FOR THE AUTHENTICATION OF ENCODED DATA

(75) Inventors: Thomas M. Stephany, Churchville, NY (US); Robert C. Bryant, Honeoye Falls, NY (US)

(73) Assignee: Eastman Kodak Company, Rochester, NY (US)

( * ) Notice: Subject to any disclaimer, the term of this patent is extended or adjusted under 35 U.S.C. 154(b) by 221 days.

(21) Appl. No.: 09/804,116

(22) Filed: Mar. 12, 2001

(65) Prior Publication Data

US 2002/0141310 A1 Oct. 3, 2002

(51) Int. Cl.[7] .............................................. G11B 7/00
(52) U.S. Cl. .................. 369/53.21; 369/47.12
(58) Field of Search .............................. 369/47.1, 47.12, 369/47.14, 53.1, 53.12, 53.2, 53.21, 53.45, 59.1, 275.1, 275.5

(56) References Cited

U.S. PATENT DOCUMENTS

| | | | |
|---|---|---|---|
| 5,818,812 A | * 10/1998 | Moribe et al. | ........... 369/47.15 |
| 6,034,930 A | 3/2000 | Kitahara | ...................... 369/47 |
| 6,335,912 B1 | * 1/2002 | Kobayashi et al. | ........ 369/59.1 |

* cited by examiner

Primary Examiner—Muhammad Edun
(74) Attorney, Agent, or Firm—Peyton C. Watkins

(57) ABSTRACT

A data recording element includes a data recording medium and a recording medium support; data recorded on the data recording medium; and c) a unique ID corresponding to the data on the recording medium, recorded on the recording medium support.

18 Claims, 3 Drawing Sheets

METHOD AND APPARATUS FOR THE AUTHENTICATION OF ENCODED DATA

FIELD OF THE INVENTION

The present invention relates to security of data storage mediums having software thereon and, more particularly, to such data storage mediums having invisible ink for storing a security code for permitting access to the stored software.

BACKGROUND OF THE INVENTION

Various amusing computer games software have been developed for home video games of which various games can be played by changing CD ROMs. Such video games are very popular for amusement. Sometimes, the supply of popular game software does not catch up with the demand, and CD-ROMs caring games software are trading at high prices. Counterfeits of such CD ROMs are continually been discovered.

Producers of games software have made various security systems to prohibit counterfeiting of games software which is the fruit of development by producers with considerable amounts of investment of time, money and effort.

One such security system is disclosed in U.S. Pat. No. 6,034,930. In this system, a trademark containing embedded data is placed on the CD-ROM. A sensor reads the embedded data and compares it with reference data previously stored in the game unit. If the data matches, the software program is initialized for operation, and if there is not a match, operation of the software program is prohibited.

Although the above-described method and apparatus are satisfactory, it includes drawbacks. For instance, it is sometimes desirable for commercial reasons not to include a trademark, or any of the visual indication, on the surface of the CD-ROM. Consequently, a need exists for security mechanisms which do not utilize visual indications.

SUMMARY OF THE INVENTION

The need is met according to the present invention by providing a data recording element, comprising (a) a data recording medium and a recording medium support; (b) data recorded on the data recording medium; and (c) a unique ID corresponding to the data on the recording medium, recorded on the recording medium support.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

The invention has been described in detail with particular reference to certain preferred embodiments thereof, but it will be understood that variations and modifications can be effected within the spirit and scope of the invention.

Figure 1:
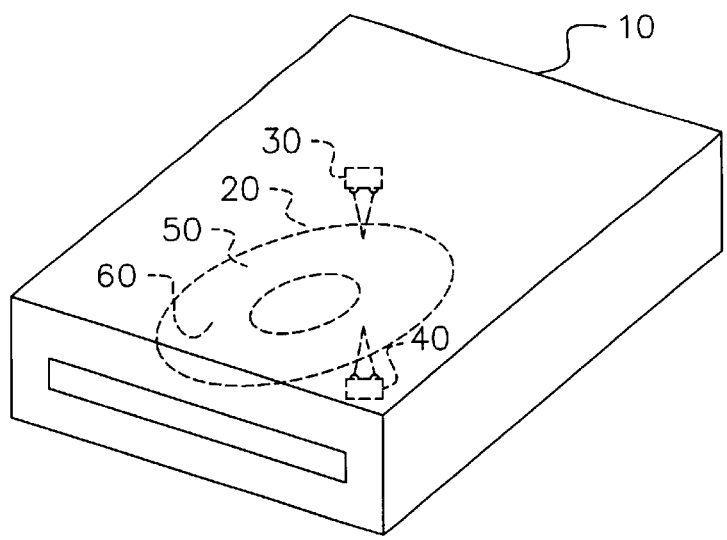
FIG. 1 is a perspective view of a reader illustrating its internal mechanics and a CD-ROM of the present invention.

Referring to FIG. 1, there is shown a CD ROM reader 10 of the present invention for receiving and operating CD ROMs 20. The reader 10 includes an infrared emitter and sensor module 30 therein for reading invisible ink on the upper surface of the CD-ROM 20. The reader 10 also includes a secondary emitter and sensor module 40 for retrieving the software program stored on the CD-ROM. This standard CD-ROM configuration, except for the infrared emitter and sensor module 30, is well known in the art.

The CD-ROM 20 includes a first surface 50, or recording medium support surface, having a digital number encoded thereon via invisible ink. The invisible ink may be, for example, Tennessee Eastman dye pm 19599/10. The digital number is different for each CD-ROM 20 and is predetermined by the content of the CD-ROM 20. The information recorded in a predetermined sector is analyzed and a digital number is determined by an algorithm from the data in the predetermined sector. This digital number will be used for a security comparison as will later become readily apparent. The CD-ROM 20 also includes a second surface 60, or data recording medium surface, in which the digital data is stored. The stored data may be, for example, pictorial images, text, graphics, amusement games or the like. A predetermined sector on the second surface includes the exact digital number which is stored on the first surface. The reader 10 compares the digital number from the first and second surfaces, and if they are the same or in checksum, the operation of the reader 10 is initiated. If they are not in agreement, operation of the reader 10 is prohibited.

Figure 2:
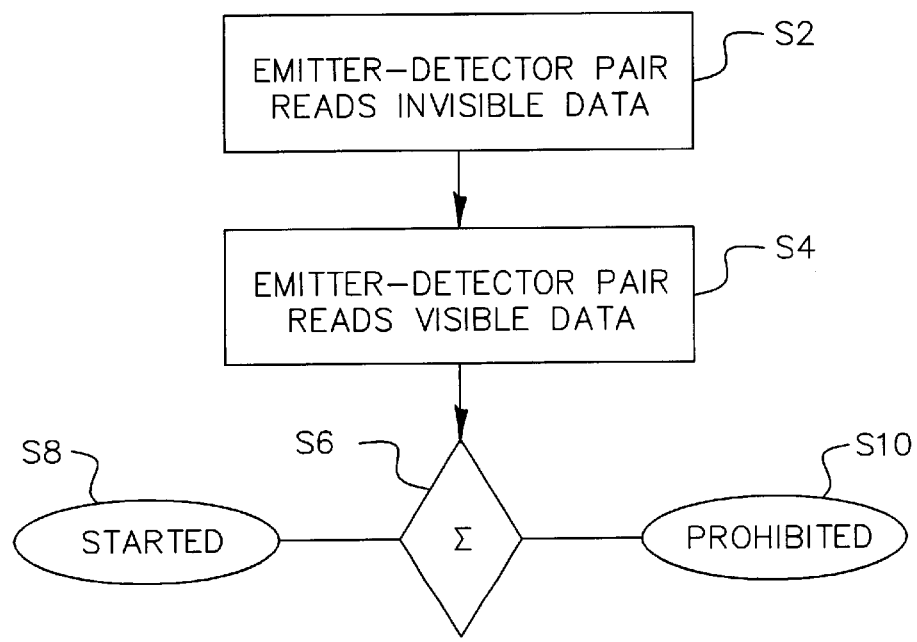
FIG. 2 is a flowchart of a comparison software program of the present invention.

Referring to FIG. 2, there is shown a flowchart of the comparison software program of the present invention. The comparison software is preferably stored as firmware in the reader. This operation includes starting the software upon proper insertion of the CD-ROM. The software directs S2 the emitter and sensor pair 30 to read the invisible data (number) on the first surface 50. The software then directs S4 the secondary emitter and sensor pair 40 to read the predetermined sector of the second surface for retrieving the digital number thereon. If the numbers are the same S6, operation of the software program is started S8. If they are not the same S6, operation of software program is prohibited S 10 and an error message is displayed to the user.

Figure 3:
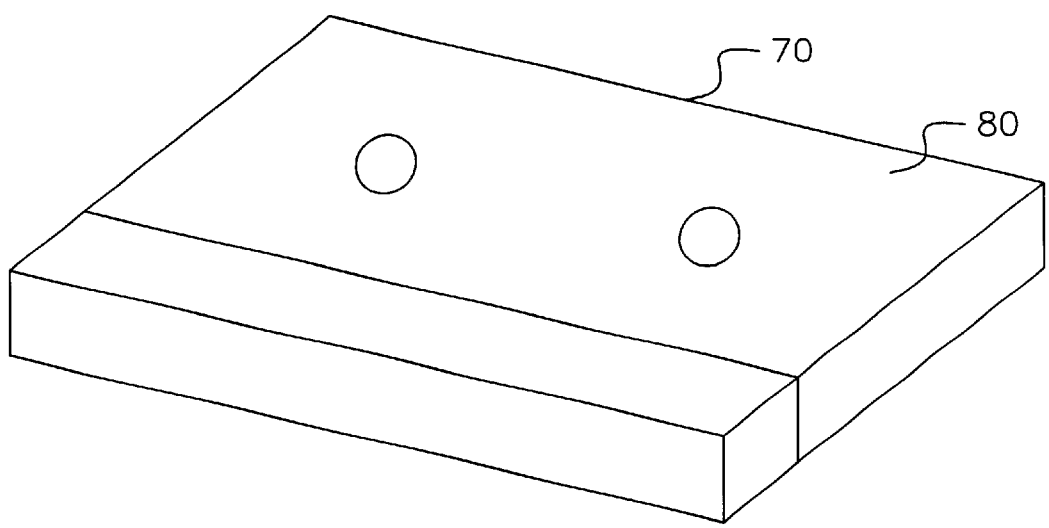
FIG. 3 is an alternative embodiment of the present invention.

As will be apparent to those skilled in the art, other data recording mediums may be used in lieu of the CD-ROM. Referring to FIG. 3, one such embodiment is a videotape 70. The invisible data is placed on the plastic housing 80 or case and the corresponding digital number is stored on the magnetic tape (not shown). In this embodiment, the corresponding digital number is stored on the initial portion of the magnetic tape. As is obvious to those killed in the art, the comparison software will be slightly modified so that this initial portion is read and further reading is prohibited until the security check has been satisfied. Still further, the reader 10 will also be modified to accommodate videotapes in lieu of CD-ROMs, as is obvious to those skilled in the art and will not be discussed in detail herein.

Figure 4:
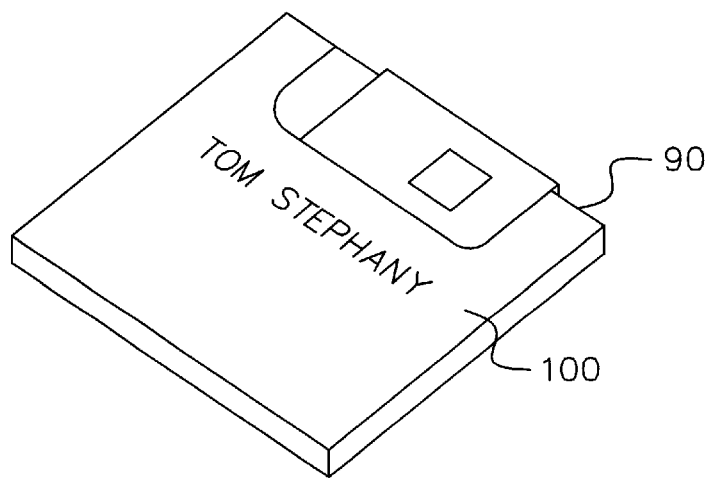
FIG. 4 is an alternative embodiment of the present invention.

Referring to FIG. 4, there is shown another alternative embodiment. In this embodiment, the invisible data is placed on the outer shell 100 of a floppy disk 90 and the corresponding digital number is stored on the disk. The method of using the disk 90 and the reader 10 is substantially similar to that for CD-ROM 20 and will not be discussed in detail herein.

Figure 5:
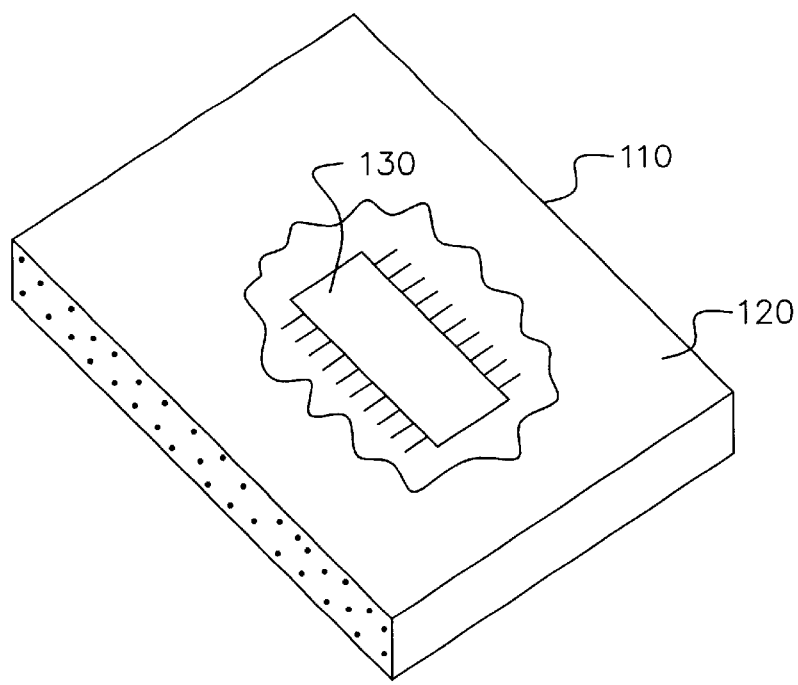
FIG. 5 is an alternative embodiment of the present invention.

Referring to FIG. 5, there is shown an alternative embodiment of a solid state memory cartridge 110. In this embodiment, the invisible data is placed on the plastic case 120 of the solid state memory cartridge 110 and the corresponding digital number is stored in the integrated circuit 130. The method of using the solid state memory cartridge 110 and the reader 10 is substantially similar to that for the CD-ROM 20 and will not be discussed in detail herein.

Figure 6:
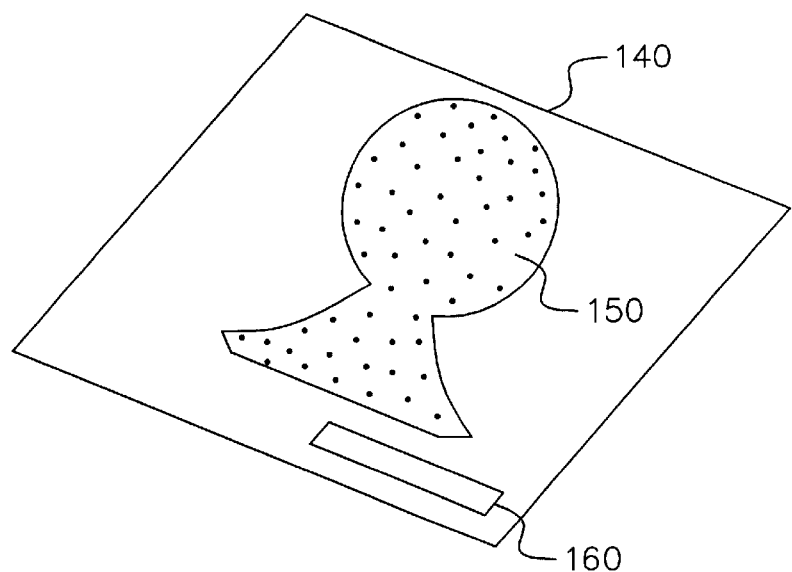
FIG. 6 is an alternative embodiment of the present invention.

Referring to FIG. 6, there is shown an alternative embodiment of a photograph 140. In this embodiment, the invisible data is placed within the image 150 and the corresponding digital number is stored in a predetermined portion 160 of the photograph 140. The method of using the photograph 140 and the reader 10 is substantially similar to that for the CD-ROM 20 and will not be discussed in detail herein.

The invention has been described with reference to a preferred embodiment. However, it will be appreciated that variations and modifications can be effected by a person of ordinary skill in the art without departing from the scope of the invention.

PARTS LIST

| | |
|---|---|
| 10 | CD ROM reader |
| 20 | CD ROMs |
| 30 | infrared emitter and sensor module |
| 40 | secondary emitter and sensor module |
| 50 | first surface |
| 60 | second surface |
| 70 | videotape |
| 80 | plastic housing |
| 90 | floppy disk |
| 100 | outer shell (of the floppy disk) |
| 110 | solid state memory cartridge |
| 120 | plastic case (of the solid state memory cartridge) |
| 130 | integrated circuit |
| 140 | photograph |
| 150 | image |
| 160 | predetermined portion (of the photograph) |
| S2 | flow chart step |
| S4 | flow chart step |
| S6 | flow chart step |
| S8 | flow chart step |
| S10 | flow chart step |

What is claimed is:

1. A data recording element, comprising:
   a) a data recording medium and a recording medium support;
   b) data recorded on the data recording medium; and
   c) a unique ID, corresponding to the data on the recording medium, recorded on the recording medium support, wherein the unique ID is recorded in invisible ink.

2. The data recording element claimed in claim 1, wherein the data recorded on the data recording medium includes the unique ID.

3. The data recording element claimed in claim 1, wherein the unique ID is derived from data recorded on the data recording medium.

4. The data recording element claimed in claim 3, wherein the unique ID is a checksum of the data recorded on the data recording medium.

5. The data recording element claimed in claim 1, wherein the data recording element is an optical disc having a data side and a label side and the unique ID is recorded on the label side of the disc.

6. The data recording element claimed in claim 1, wherein the data recording element is a magnetic tape cassette, the data storage medium is magnetic tape, the recording medium support is a plastic case, and the unique ID is recorded on the plastic case.

7. The data recording element claimed in claim 1, wherein the data recording element is a magnetic disc cassette, the data storage medium is a magnetic disc, the recording medium support is a sleeve, and the unique ID is recorded on the sleeve.

8. The data recording element claimed in claim 1, wherein the data recording element is a solid state memory cartridge, the data storage medium is a solid state memory, the recording medium support is a plastic case surrounding an integrated circuit package, and the unique ID is recorded on the plastic case.

9. The data recording element claimed in claim 1, wherein the unique ID is recorded steganographically in an image on the recording medium support.

10. A system for preventing the reading of data from a counterfeit recording, comprising:
    a) a data recording element, including:
       i) a data recording medium and a recording medium support;
       ii) data recorded on the data recording medium; and
       iii) a unique ID, corresponding to the data on the recording medium, recorded on the recording medium support, wherein the unique ID is recorded in invisible ink; and
    b) a data reader for reading data from the data recording element, the data reader including:
       i) a first reading device for reading the data on the recording medium;
       ii) a second reading device for reading the unique ID recorded on the recording medium support; and
       iii) logic and control means for comparing the data read from the data recording medium and the unique ID and allowing output of the data only if the unique ID corresponds to the data read from the data recording medium.

11. The system claimed in claim 10, wherein the data recorded on the data recording medium includes the unique ID.

12. The system claimed in claim 10, wherein the unique ID is derived from data recorded on the data recording medium.

13. The system claimed in claim 12, wherein the unique ID is a checksum of the data recorded on the data recording medium.

14. The system claimed in claim 10, wherein the data recording element is an optical disc having a data side and a label side and the unique ID is recorded on the label side of the disc.

15. The system claimed in claim 10, wherein the data recording element is a magnetic tape cassette, the data storage medium is magnetic tape, the recording medium support is a plastic case, and the unique ID is recorded on the plastic case.

16. The system claimed in claim 10, wherein the data recording element is a magnetic disc cassette, the data storage medium is a magnetic disc, the recording medium support is a sleeve, and the unique ID is recorded on the sleeve.

17. The system claimed in claim 10, wherein the data recording element is a solid state memory cartridge, the data storage medium is a solid state memory, the recording medium support is an integrated circuit package, and the unique ID is recorded on the integrated circuit package.

18. The system claimed in claim 10, wherein the unique ID is recorded steganographically in an image on the recording medium support.

* * * * *